(12) United States Patent
Schmid

(10) Patent No.: US 12,161,529 B2
(45) Date of Patent: Dec. 10, 2024

(54) IMPLANT PLATE DEVICE

(71) Applicant: TADMAN GMBH, Gunningen (DE)

(72) Inventor: Edwin Schmid, Stockach (DE)

(73) Assignee: TADMAN GMBH, Gunningen (DE)

( * ) Notice: Subject to any disclaimer, the term of this patent is extended or adjusted under 35 U.S.C. 154(b) by 377 days.

(21) Appl. No.: 17/615,784

(22) PCT Filed: May 27, 2020

(86) PCT No.: PCT/EP2020/064748
§ 371 (c)(1),
(2) Date: Dec. 1, 2021

(87) PCT Pub. No.: WO2020/245007
PCT Pub. Date: Dec. 10, 2020

(65) Prior Publication Data
US 2022/0233281 A1  Jul. 28, 2022

(30) Foreign Application Priority Data
Jun. 7, 2019 (DE) ...................... 10 2019 115 476.6

(51) Int. Cl.
*A61C 7/10* (2006.01)
*A61C 8/00* (2006.01)
*B33Y 80/00* (2015.01)

(52) U.S. Cl.
CPC .............. *A61C 8/0092* (2013.01); *A61C 7/10* (2013.01); *B33Y 80/00* (2014.12)

(58) Field of Classification Search
CPC .......... A61C 8/0096; A61C 7/10; B33Y 80/00
See application file for complete search history.

(56) References Cited

U.S. PATENT DOCUMENTS

| 9,351,810 | B2 | 5/2016 | Moon |
| 2002/0150856 | A1 | 10/2002 | Payton |

(Continued)

FOREIGN PATENT DOCUMENTS

| DE | 102004046414 A1 | 4/2006 |
| DE | 102017129289 A1 | 6/2019 |

(Continued)

OTHER PUBLICATIONS

International Preliminary Report and Written Opinion on the Patentability of Application No. PCT/EP2020/064748, Mailed Dec. 7, 2021, 11 pages.

(Continued)

*Primary Examiner* — Ralph A Lewis
(74) *Attorney, Agent, or Firm* — Womble Bond Dickinson (US) LLP

(57) ABSTRACT

An implant plate device comprises a plate base body, further comprises at least one fixing recess, which is introduced in the plate base body and is configured for receiving a jawbone screw that is configured, for a fixation of the plate base body, to be screwed through the fixing recess into a bone, in particular a jawbone, and comprises at least one inner thread adjoining the fixing recess,
wherein the implant plate device comprises at least one functional recess, introduced in the plate base body, for a coupling with an orthodontic treatment apparatus and/or with a drilling and/or insertion templet.

9 Claims, 5 Drawing Sheets

(56) References Cited

U.S. PATENT DOCUMENTS

Figure 1:
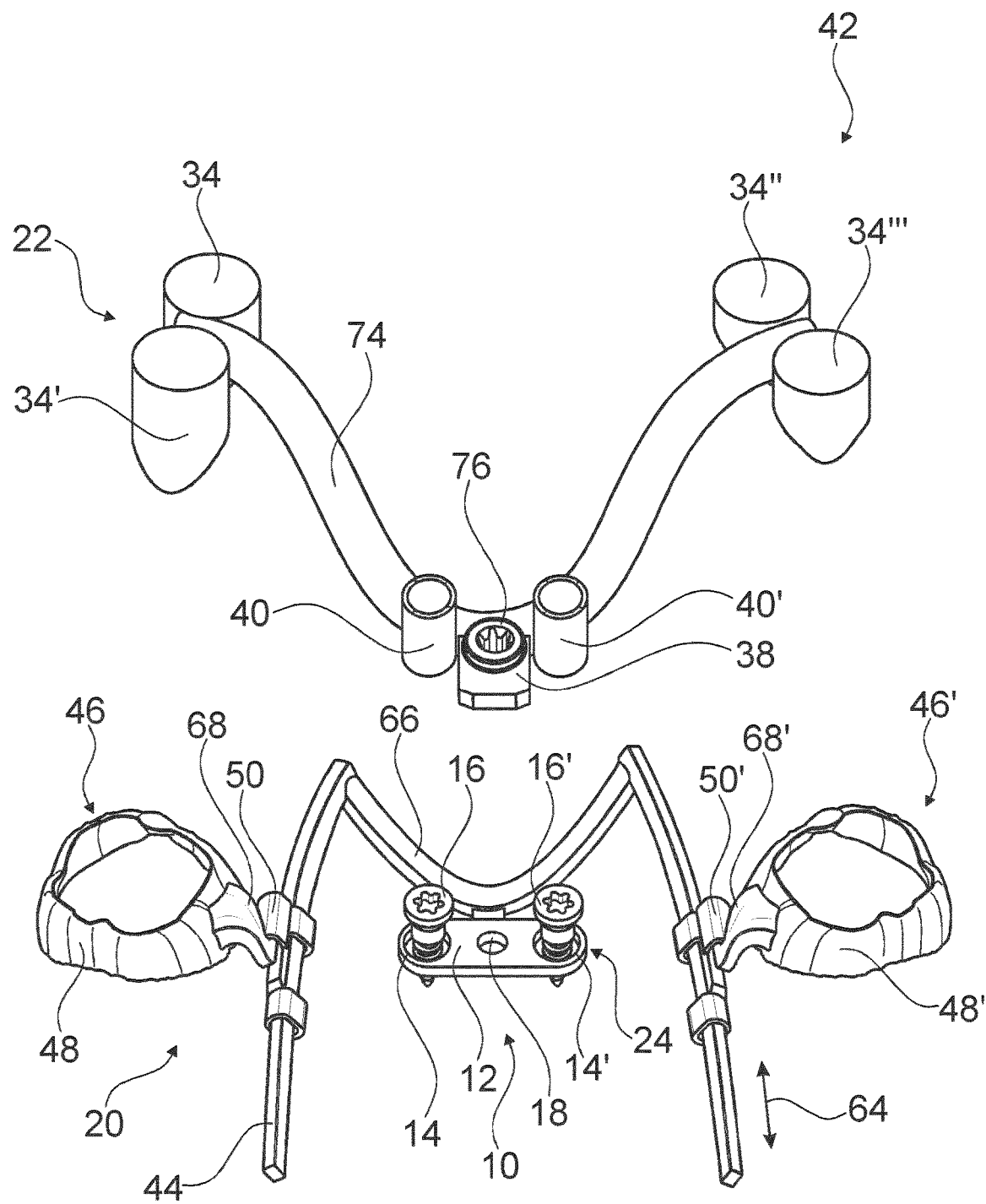

| | | | |
|---|---|---|---|
| 2005/0147938 A1 | 7/2005 | Devincenzo et al. | |
| 2006/0069389 A1 | 3/2006 | Christian | |
| 2009/0130620 A1* | 5/2009 | Yazdi | A61C 7/10 |
| | | | 433/7 |
| 2010/0004691 A1 | 1/2010 | Amato et al. | |
| 2012/0202164 A1* | 8/2012 | Hsu | A61C 7/00 |
| | | | 433/18 |
| 2013/0189640 A1 | 7/2013 | Kook et al. | |
| 2013/0252195 A1* | 9/2013 | Popat | A61C 7/10 |
| | | | 433/7 |
| 2019/0159873 A1* | 5/2019 | Kaveh | A61C 8/0096 |

FOREIGN PATENT DOCUMENTS

| | | |
|---|---|---|
| WO | 02089682 A1 | 11/2002 |
| WO | 2011118969 A2 | 9/2011 |
| WO | 2012023736 A2 | 2/2012 |

OTHER PUBLICATIONS

German Office Action and Search Report on the Patentability of Application No. DE 10 2019 115 476.6, Mailed Mar. 24, 2020, 12 pages.

Anonymous: "Benefit.KFO Technical Guide", PSM Medical Solutions, Mar. 2016, 32 pages.

* cited by examiner

IMPLANT PLATE DEVICE

RELATED APPLICATIONS

The present application is the National Phase of International Application No. PCT/EP2020/064748 filed on May 27, 2020, which claims priority to the benefit of German patent Application no. 10 2019 115 476.6 filed on Jun. 7, 2019, and the disclosures of which are hereby incorporated herein by reference in their entireties.

STATE OF THE ART

The invention concerns an implant plate device as well as an associated implant system, a combined drilling and/or insertion templet for a mounting of the implant system, and a regulation system fora correction of tooth and/or jaw positions.

An implant plate device has already been proposed, with a plate base body and with at least one fixing recess, which is introduced in the plate base body and is configured for receiving a jawbone screw that is configured, for a fixation of the plate base body, to be screwed through the fixing recess into a bone, in particular a jawbone.

The objective of the invention is in particular to provide a generic device having improved characteristics regarding mountability and accuracy of position.

Advantages of the Invention

The invention is based on an implant plate device with a plate base body, with at least one fixing recess, which is introduced in the plate base body and is configured for receiving a jawbone screw that is configured, for a fixation of the plate base body, to be screwed through the fixing recess into a bone, in particular a jawbone, and with at least one inner thread adjoining the fixing recess.

It is proposed that the implant plate device comprises at least one functional recess, introduced in the plate base body, for a coupling with an orthodontic treatment apparatus and/or with a combined drilling and/or insertion templet. Particularly preferentially the functional recess may be configured for a coupling with a drilling and/or insertion templet as well as for a later coupling with an orthodontic treatment apparatus. Preferentially, the functional recess has different functions depending on a fitting-in state of the plate base body. Preferably the implant plate device is realized by a bone plate. Different implementations of a bone plate, deemed expedient by someone skilled in the art, are conceivable, like for example as a neuro-surgical bone plate. However, preferentially the bone plate is implemented by an orthodontic bone plate, like in particular a mentoplate, a uniplate and/or an alveolar plate. Preferably the jawbone screw is implemented by an implant screw, in particular a BENEfit® screw.

The implant plate device is in particular implemented by a superimposed jaw implant. Preferably the implant plate device is in particular implemented by a temporary orthodontic implant that is fastened in a jaw by means of a jawbone screw.

By an "implant plate device" is in particular, in this context, a plate-shaped device to be understood which is configured for a fastening to a bone. Preferably the implant plate device is in particular implemented by an orthodontic bone plate. Furthermore, a "plate base body" is in particular to mean, in this context, a plate-shaped base body of the implant plate device. The plate base body preferably has a thickness of less than 6 mm, preferably of less than 4 mm and particularly preferentially of less than 2 mm. Preferentially the plate base body has a thickness of approximately 1 mm. By a "fixing recess" is in particular, in this context, a recess, in particular a bore, to be understood via which the implant plate device can be fixed to a bone, in particular to a jawbone. Preferably the fixing recess is implemented by an at least approximately cylindrical pass-through recess extending throughout the implant plate device. By a "functional recess" is in particular, in this context, a recess, in particular a bore, to be understood via which an orthodontic treatment apparatus and/or a drilling and/or insertion templet can be coupled releasably with the implant plate device. The functional recess is preferably formed by an approximately cylindrical pass-through recess extending through the plate base body. Preferentially the functional recess is configured for a functional expansion of the implant plate device. Preferably the functional recess in particular serves for a releasable modular coupling of different orthodontic treatment apparatuses and/or drilling and/or insertion templets. An "orthodontic treatment apparatus" is in particular to mean, in this context, an apparatus for a direct orthodontic treatment. Preferably the orthodontic treatment apparatus comprises at least one fastening element, like in particular a bracket and/or an orthodontic band or other elements for a coupling with a tooth or with several teeth. Moreover, by a "drilling and/or insertion templet" is in particular, in this context, an element to be understood that is configured for a positionally accurate introduction of the jawbone screws. Preferably the drilling and/or insertion templet is implemented by a temporarily used templet that is configured for a positionally accurate and angle-accurate pre-drilling in the jawbone and for the introduction of the jawbone screws in a jaw and in the implant plate device. "Configured" is in particular to mean specifically programmed, designed and/or equipped. By an object being configured for a certain function is in particular to be understood that the object fulfills and/or executes said certain function in at least one application state and/or operation state.

The implementation of the implant plate device according to the invention in particular allows providing an advantageously positionally stable implant plate device. In particular, an advantageously positionally accurate and angle-accurate introduction of the implant plate device on a jaw is achievable. It is furthermore possible to provide an implant plate device that is introducible in an advantageously simple manner. Moreover, in particular an advantageously modular utilization of the implant plate device is achievable. In particular, depending on a usage, different orthodontic treatment apparatuses may be coupled releasably with the implant plate device. In particular, over a treatment period, different orthodontic treatment apparatuses can be used consecutively with the same implant plate device. It is in particular possible to do without additional jawbone screws. Furthermore, in particular a firm anchoring in the bone is achievable by means of the implant plate device. This in particular enables advantageously high traction, like for example for a distalization of the molars.

It is further proposed that the implant plate device comprises at least one inner thread which adjoins the functional recess and is configured for an angle-stable coupling with an orthodontic treatment apparatus and/or with a drilling and/or insertion templet. Especially preferentially the functional recess may be configured for an angle-stable coupling with a drilling and/or insertion templet, as well as for a later coupling with an orthodontic treatment apparatus. The inner thread is in particular configured for a screwing coupling of the orthodontic treatment apparatus and/or of the drilling and/or insertion templet with the functional recess. In particular, the orthodontic treatment apparatus and/or the drilling and/or insertion templet can be screwed into the functional recess. This in particular allows achieving an advantageously simple and secure coupling of different orthodontic treatment apparatuses and/or drilling and/or insertion templets. In particular, a releasable coupling is achievable.

Furthermore it is proposed that the implant plate device comprises a further fixing recess, which is introduced in the plate base body, which is arranged on a side of the functional recess that is situated opposite the fixing recess and which is configured for receiving a jawbone screw that is configured, for a fixation of the implant plate device, to be screwed through the fixing recess into a bone, in particular a jawbone, and which comprises at least one inner thread adjoining the further fixing recess. Preferably the fixing recess and the further fixing recess are in each case arranged neighboring the functional recess. Preferentially the fixing recess, the further fixing recess and the functional recess extend in each case through the plate base body perpendicularly to a main extension plane of the implant plate device. The extension axes of the fixing recess, the further fixing recess and the functional recess preferably extend in each case perpendicularly to a main extension plane of the implant plate device. The extension axes of the fixing recess, the further fixing recess and the functional recess are in particular arranged in a common plane. Preferably the extension axes of the fixing recess, the further fixing recess and the functional recess in each case correspond to a bore axis and/or a rotational symmetry axis of the respective recess. By a "main extension plane" of a structural unit is in particular a plane to be understood which is parallel to a largest side surface of a smallest imaginary rectangular cuboid just still completely enclosing the structural unit, and which in particular runs through the center of the rectangular cuboid. This in particular allows providing an advantageously positionally stable implant plate device. In particular, an advantageously positionally stable and angle-stable introduction of the implant plate device on a jaw is achievable. It is furthermore possible to provide an implant plate device that is advantageously easily introducible.

Moreover it is proposed that a maximum extension of the plate base body is 20 mm. Preferably the maximum extension of the plate base body, in particular along a main extension direction of the implant plate device, is maximally 18 mm, preferably no more than 16 mm and especially preferentially maximally 14 mm. Preferably, the maximum extension of the plate base body, in particular along a main extension direction of the implant plate device, is at least approximately 12 mm. By a "main extension direction" of an object is herein in particular a direction to be understood that runs parallel to a longest edge of a smallest geometrical rectangular cuboid just still completely enclosing the object. This in particular allows providing an advantageously compact implant plate device.

Beyond this the invention proposes an implant system with an implant plate device according to one of the preceding claims and with at least one jawbone screw which is configured, for a fixation of the implant plate device on a bone, in particular a jawbone, to be screwed through the fixing recess into a bone, in particular a jawbone. It is further proposed that the at least one jawbone screw comprises at least one first thread for screwing into a bone and at least one second thread for screwing into the inner thread of the implant plate device that adjoins the fixing recess, wherein a thread pitch of the first thread differs from a thread pitch of the second thread. Preferably the jawbone screw has at its head a thread that is respectively configured to be screwed into an inner thread of the fixing recess of the implant plate device. Preferentially, the thread of the head of the jawbone screw has a pitch that differs from the main thread of a threaded shaft of the jawbone screw. Preferentially, the different thread pitches will result in maintaining the distance for a lifting or a pressing to the mucous membrane or to the bone. The first thread is in particular implemented by a self-drilling or self-cutting bone thread whereas the second thread is implemented by a special head thread engaging into a respectively matching thread in the implant plate device in such a way that an angle-stable connection is created in a certain angle range between a longitudinal implant axis and a longitudinal thread axis. The second thread of the jawbone screw is in particular characterized in that, during insertion in the jaw, it engages into the inner thread of the implant plate device in such a way that a force-fit and torque-fit connection is created at the end of the insertion process. This allows dispensing with additional connection elements. Optionally the screwhead may be equipped with an additional thread within its head region for receiving further elements. In this way it is in particular achievable that the jawbone screw enters a fix connection with the fastening unit and with the expansion unit, resulting in a secure three-dimensional construction.

It is also proposed that the thread pitch of the second thread of the jawbone screw is greater than the thread pitch of the first thread of the jawbone screw. Particularly preferentially the thread of the head of the jawbone screw has a greater thread pitch than the thread proper of a threaded shaft of the jawbone screw. In this way, by turning the thread at the head of the jawbone screw into the implant plate device, a subsequent lifting of the implant plate device and thus a lifting of the patient's mucous membrane is achievable. In addition, it would be conceivable, with a corresponding implementation of the inner thread of the implant plate device and/or of the thread of the head of the jawbone screw, to achieve, in a limited way, a multi-directional alignment.

The invention is further based on a drilling and/or insertion templet for a mounting of the implant system on a jaw, with at least one alignment element for a support on at least one tooth and with at least one fixing element, which is firmly connected to the alignment element and is configured to be connected to the implant plate device via the functional recess. The drilling or insertion templet is in particular embodied by a tooth-borne drilling or insertion templet for the implant plate device. The drilling and/or insertion templet in particular serves, in a connection with the implant plate device, as an auxiliary member for pre-drilling and for an introduction of jawbone screws, in particular implants, into the jaw. The drilling and/or insertion templet is in particular supported on at least one, in particular on at least three or more, dental occlusion surfaces. The alignment element preferably comprises on at least one side a tooth surface contour for an unambiguous positioning on a tooth. Preferably the alignment element is in particular configured for a positionally accurate support on a tooth, in particular a molar. The alignment element in particular serves for a positioning and support of the drilling and/or insertion templet in a jaw. It would moreover be conceivable, for example, that the at least one alignment element is connected to a tooth temporarily by gluing, for the purpose of avoiding a slipping of the drilling and/or insertion templet. By an "alignment element" is in particular, in this context, an element to be understood via which an operator can position the drilling and/or insertion templet relative to a jaw in a defined manner. In particular, the alignment element has a defined, unambiguous relational position in an oral cavity. The alignment element is in particular manufactured at least partly individually and is adapted to the defined unambiguous relational position in the oral cavity. By a "fixing element" is in particular, in this context, an element to be understood via which the drilling and/or insertion templet can be connected to the implant system, in particular the implant plate device, directly. In particular, the fixing element is configured to be connected to the implant plate device by means of a screw and/or plug connection. The fixing element is in particular configured to create a releasable connection to the implant plate device. The fixing element is in particular arranged in a central portion of the drilling and/or insertion templet and comprises a counterbore. By means of a fixation screw passed through the counterbore, the drilling and/or insertion templet is in particular connectable to the implant plate device in a rotationally fixed manner. The alignment elements which are embodied as occlusal supports are in particular connected to the central fixing element via a frame structure. In this way, it is in particular possible to achieve an advantageously secure and positionally accurate mounting of the implant system on a jaw. In particular, prior to pre-drilling and screwing-in of the jawbone screws, the implant plate device can be positioned on the jaw in a defined manner. Furthermore, in particular an advantageously stable and precise support of the drilling and/or insertion templet on a jaw is achievable.

It is further proposed that the drilling and/or insertion templet comprises at least one guiding cylinder, which is firmly connected to the fixing element, for guiding a pre-drill and/or an insertion instrument for the jawbone screw. The guiding cylinder is in particular implemented of a hollow cylinder. Preferably, the guiding cylinder is in particular implemented by a guiding sleeve for an angle-preserving guiding of a pre-drill and/or of an insertion instrument for the jawbone screw. This in particular allows achieving angle-preserving screwing of the at least one jawbone screw, in particular relative to the at least one inner thread of the implant plate device. By a "guiding cylinder" is in particular, in this context, a hollow-cylindrical element to be understood that is configured for axially guiding a pre-drill and/or an insertion instrument and/or of a jawbone screw. Preferably the guiding cylinder is configured to align a rotation axis of the pre-drill and/or of an insertion instrument and/or of a jawbone screw relative to the implant plate device. In particular, the guiding cylinder is configured to align a rotation axis of a pre-drill and/or of an insertion instrument and/or of a jawbone screw perpendicularly to a main extension plane of the implant plate device. By the at least one guiding cylinder, in particular an advantageously precise, in particular angle-preserving, screwing of the at least one jawbone screw is achievable.

It is further proposed that the at least one alignment element is integrally connected to the fixing element. In this way in particular an advantageously accurate and stable drilling and/or insertion templet is achievable. It is moreover possible to keep a number of structural components low. Preferably the entire drilling and/or insertion templet is embodied in a one-part implementation. Preferentially the drilling and/or insertion templet is produced at least partly, in particular completely, in an additive manufacturing procedure, in particular in a 3D-printing procedure. Herein it would in particular be conceivable that only the alignment elements are produced individually, adapted to a patient, and are connected to a standardized fixing element. It would however also be conceivable that the entire drilling and/or insertion templet is produced individually. "Integrally" is in particular to mean connected at least by substance-to-substance bond, for example via a 3D-printing process, a welding process, a gluing process, an injection-molding process and/or another process that is deemed expedient by someone skilled in the art, and/or advantageously formed in one piece, like for example by manufacturing from a cast and/or by manufacturing in a one-component or multi-component injection-molding procedure, and advantageously from a single blank.

The invention is furthermore based on a method for producing the drilling and/or insertion templet. It is proposed that the drilling and/or insertion templet is produced, so as to be individually adapted to a shape of a jaw and/or tooth, in an additive production method, in particular in a 3D-printing procedure. The drilling and/or insertion templet is in particular produced from a synthetic material in an additive manner. This in particular allows providing a drilling and/or insertion templet that is individually adapted to a shape of a jaw. In particular, an optimum individual positioning of the drilling and/or insertion templet in a jaw is achievable. In the 3D printing procedure, the drilling and/or insertion templet is in particular structured three-dimensionally, with a construction being in particular realized layer-wise. A construction of the drilling and/or insertion templet is herein in particular realized in an additive manner. In particular, the drilling and/or insertion templet is produced by means of a computer-controlled apparatus, in particular according to a CAD template. The drilling and/or insertion templet is herein in particular produced by superficial melting of a material, in particular a synthetic material. Preferably the drilling and/or insertion templet is produced individually, depending on scan data of the jaw.

The invention is furthermore base on a regulation system for a regulation of tooth positions and/or jaw positions, with the at least one implant system and with at least one orthodontic treatment apparatus that is fastened to the implant plate device. It is proposed that the orthodontic treatment apparatus comprises at least one arch element, which is integrally connected to the plate base body of the implant plate device. This in particular allows providing a modular orthodontic treatment apparatus. In particular, different elements can be coupled with the arch element. As a result, in particular individual treatment is achievable. By an "arch element" is in particular, in this context, a guide element to be understood which is configured, in an inserted state, to extend along a dental arch, in particular on an inner or outer face of the dental arch. Preferably the arch element is configured to extend in an inserted state along the dental arch at least over a large portion of the dental arch. Especially preferentially the arch element is implemented by a metal arc. However, principally a different material, deemed expedient by someone skilled in the art, would also be conceivable. It would be conceivable that the arch element is embodied as a palatal arch and/or expansion arch, which may be provided with fastening units at its functional ends for a reversible fastening to teeth.

It is also proposed that the at least one arch element is welded or integrally connected to the plate base body of the implant plate device. This in particular allows providing an advantageous regulation system, it is in particular possible to provide an advantageously variable and compact regulation system. Preferably the at least one arch element is connected to the plate base body via a connecting web, the connecting web being welded to the plate base body and/or to the arch element. Preferably the arch element constitutes together with the connecting web a standardized component, which is optionally connectable to the plate base body. Principally the arch element is also releasably connectable to the implant plate device via the functional recess.

It is further proposed that the orthodontic treatment apparatus comprises at least one arch element having a non-circular cross section, for example an elliptic or oval cross section, in at least one treatment zone. Preferentially the arch element has a cross section that remains constant along the main extension of the arch element. Preferably the arch element is implemented by a wire having a non-circular cross section, for example an elliptic or oval cross section. The arch element is in particular configured for a coupling with a versalock connecting element. The arch element is in particular configured for a rotationally fixed and torque-proof coupling with a fastening unit. As a result, in particular rotationally fixed fastening of fastening units of the orthodontic treatment apparatus to the arch element is achievable. Furthermore, this allows providing an advantageously stable arch element. Due to the constructional provision of a differing inner diameter of the fastening unit and of the outer diameter of the non-circular arch element, a defined clearance can be set around the longitudinal axis of the arch element.

Beyond this it is proposed that the orthodontic treatment apparatus comprises at least one fastening unit for a fastening to a tooth, with at least one first fastening element for a direct fixation to a tooth, and with at least one second fastening element, which is connected to the first fastening element, for a connection to the arch element that is rotationally fix or has a defined clearance. The vertical or horizontal portion of the pin is in particular located on the oral or buccal side of the tooth and serves as a receptacle for a matching second fastening element which the arch element, an appliance, parts of an appliance or other elements can be fastened to. The second fastening element in particular comprises a fixing sleeve, preferably a so-called tube. The second fastening element in particular comprises a fixing sleeve with an inner cross section that corresponds to the pin. For a temporary fastening to the pin, the second fastening element in particular further comprises a grub screw. In this way, in particular a fastening of fastening units to the arch element is achievable that is advantageously variable and angle-stable or has defined clearance. The first fastening element is in particular implemented by a bracket and/or by an orthodontic band. Preferably the fastening unit further comprises a pin. The pin is in particular configured to be fastened to the tooth via the first fastening element, like for example an orthodontic band or a differently fixated element. The pin in particular has a round, square, rectangular or other cross section. Preferably the pin has an I-shape, an L-shape or a T-shape. Alternatively, the pin may be adhesively fastened to the tooth via a glue basis. However, preferably the pin is situated on an orthodontic band or is welded on. An integral manufacturing in the form of a cast or additively manufactured tape or ring is also provided. The vertical and horizontal portion of the pin is in particular situated on the oral or buccal side of the tooth and serves as a receptacle for a matching second fastening element, which the arch element, an appliance, parts of an appliance or other elements can be fastened to. The second fastening element in particular comprises a fixing sleeve, preferably a so-called tube. The second fastening element in particular comprises a fixing sleeve having an inner cross section that corresponds to the pin. For a temporary fastening to the pin, the second fastening element in particular further comprises a grub screw. Especially preferentially, the second fastening element is implemented as a triple tube. A versalock triple tube is in particular a fastening element with three fixing sleeves. The cross-section shape of the upper coronal fixing sleeve in particular corresponds to the shape of the cross section of the pin. The two lower fixing sleeves may have a different cross section shape and serve to receive the arch element, optionally with a defined clearance. Optionally the triple tube may comprise grub screws enabling a fixation of the pin and/or of the arch element.

It is moreover proposed that the second fastening element comprises at least one fixing sleeve, which is configured to engage around the arch element and which has an at least non-circular, in particular approximately rectangular, receiving region for the arch element. In this way, in particular a fastening of fastening units to the arch element is achievable which is advantageously variable or angle-stable or has a defined clearance. As a result, the fastening unit can in particular be fastened to the arch unit in an advantageously releasable manner. In particular, a rotationally fixed, axially variable fixation is achievable.

The implant plate device according to the invention, the implant system, the drilling and/or insertion templet, the method for producing a drilling and/or insertion template and the regulation system are herein not to be limited to the application and implementation described above. In particular, in order to achieve a functionality that is described here, the implant plate device according to the invention, the implant system, the drilling and/or insertion template, the method for producing a drilling and/or insertion template and the regulation system may comprise a number of individual elements, components and units as well as method steps that differs from a number given here. Moreover, in regard to the value ranges given in the present disclosure, values located within the given limits shall also be considered to be disclosed and to be applicable according to requirements.

DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features separately and will find further expedient combinations.

Figure 2:
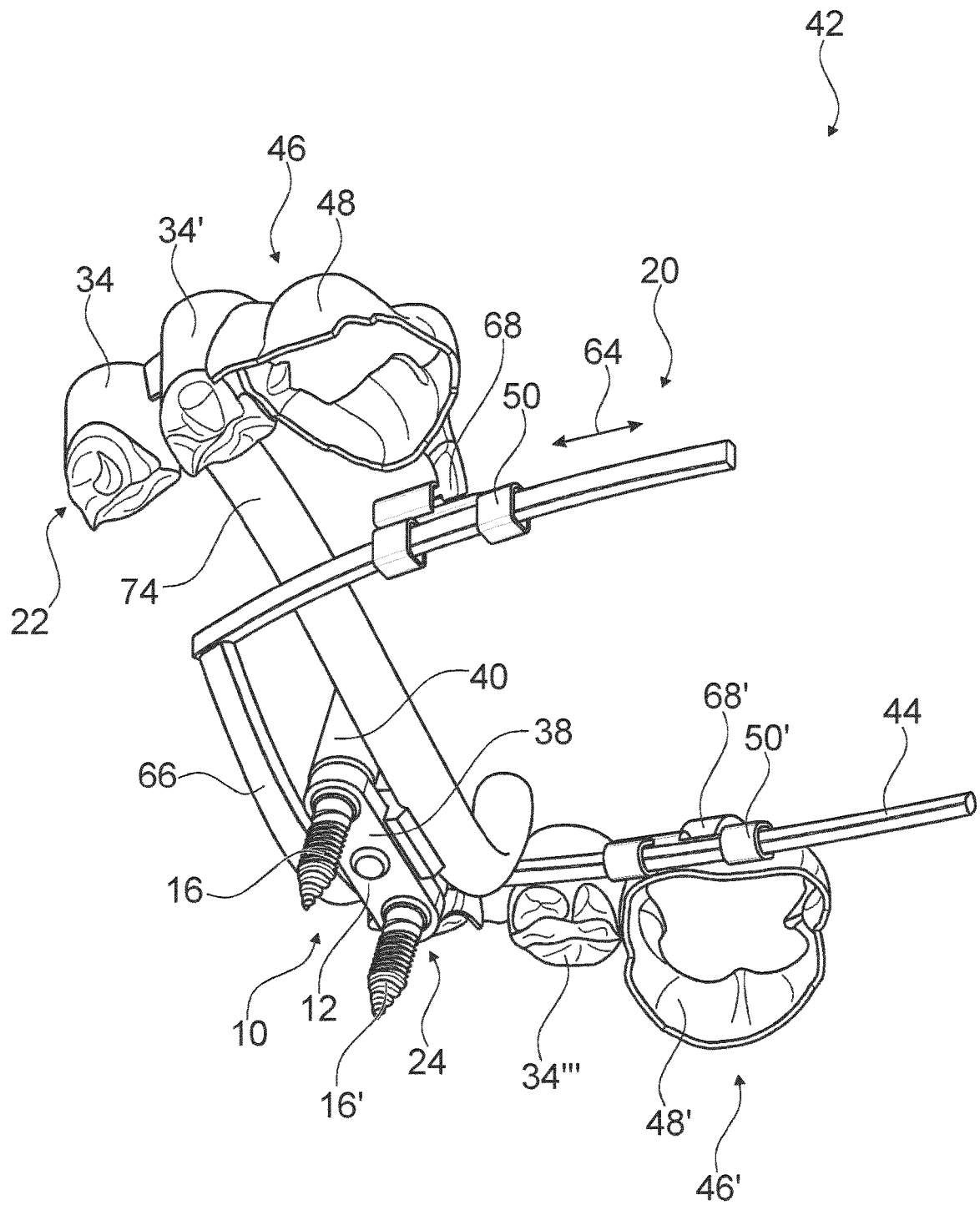
Figure 3:
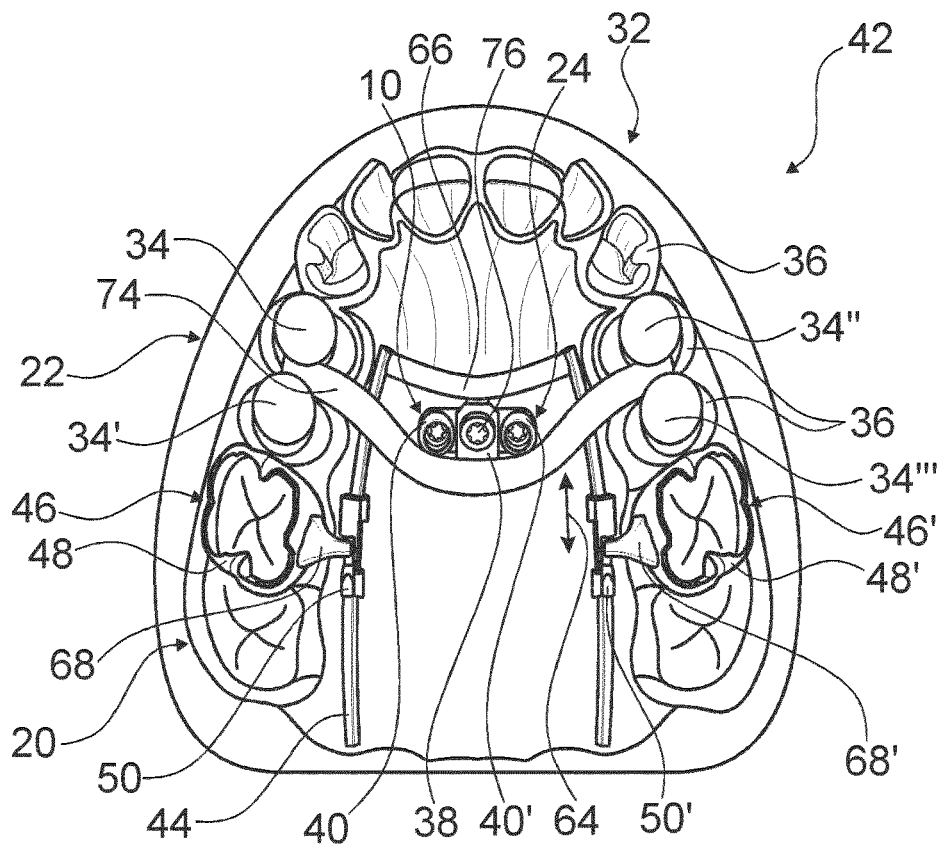
Figure 4:
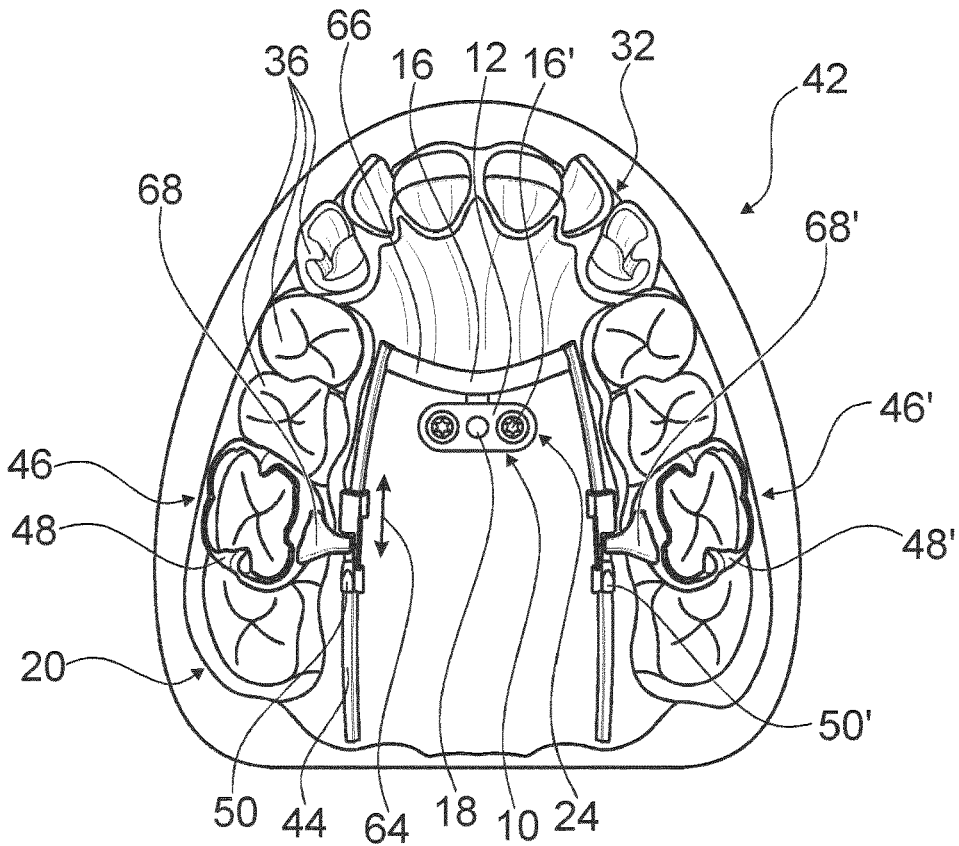
Figure 5:
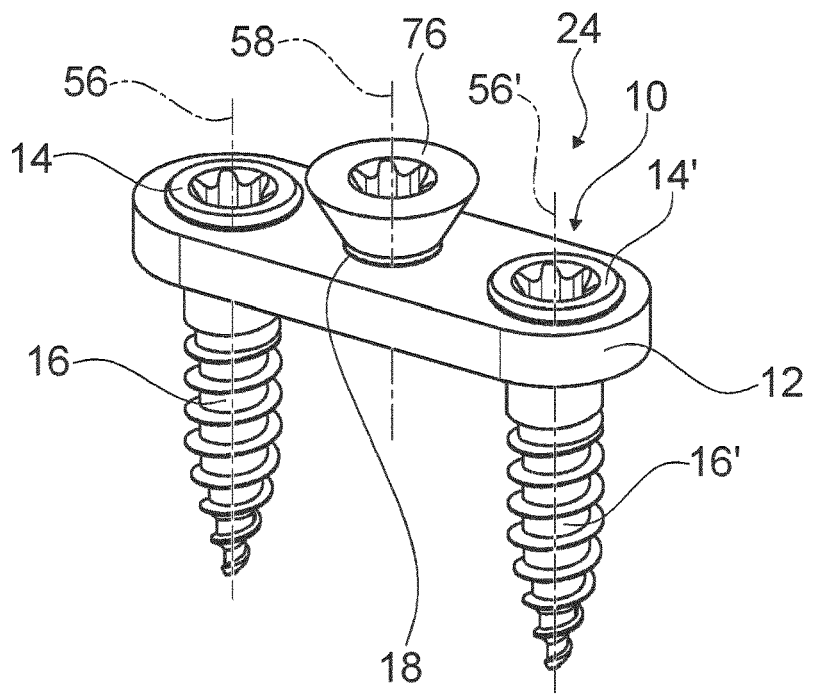
Figure 6:
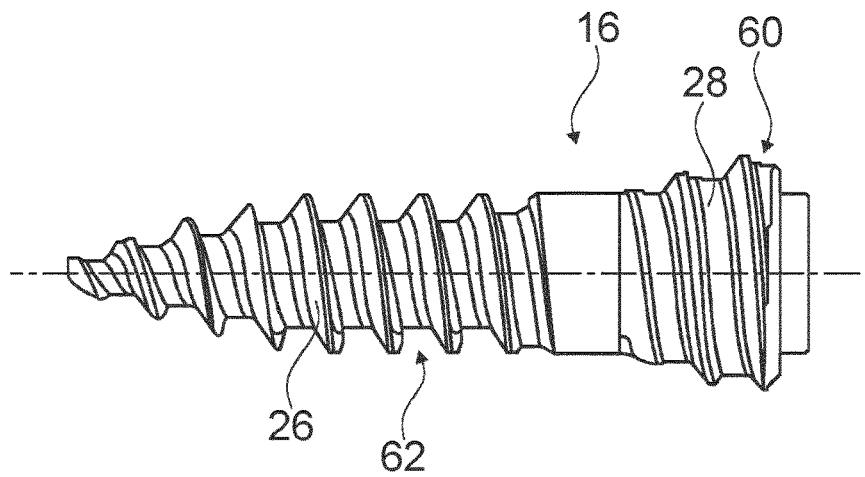
Figure 7:
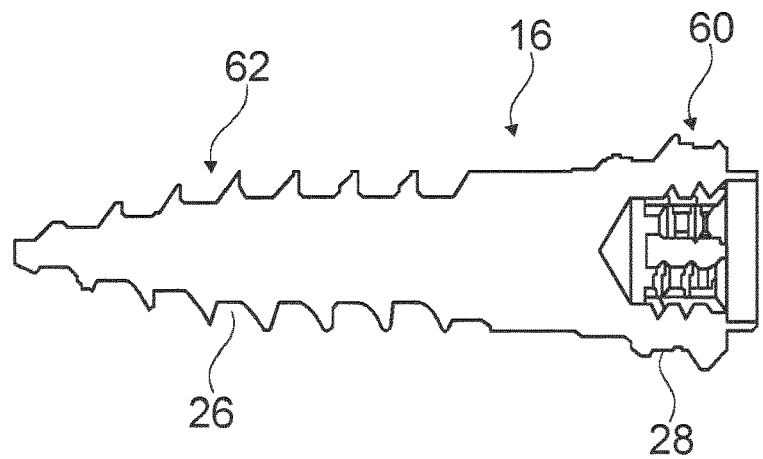
Figure 8:
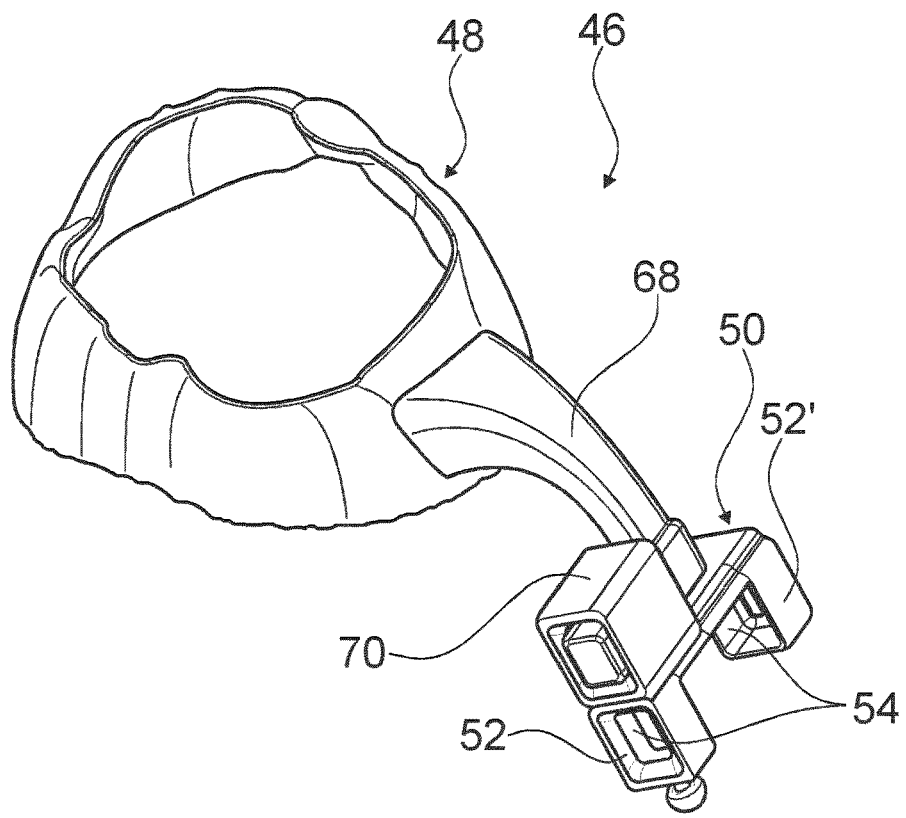
Figure 9:
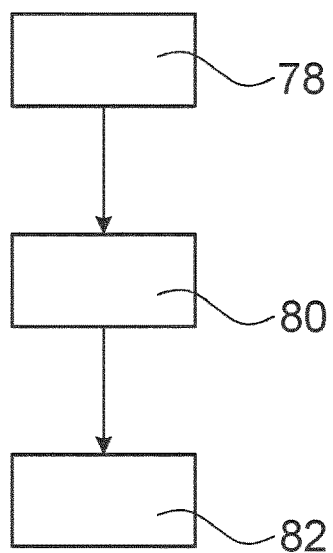

It is shown in:

FIG. 1 a regulation system with an implant system comprising an implant plate device according to the invention, and with an orthodontic treatment apparatus that is fastened on the implant plate device, and a drilling and/or insertion template for a mounting of the implant system, in a schematic view from above, FIG. 2 the regulation system with the implant system and with the orthodontic treatment apparatus that is fastened on the implant plate device, and the drilling and/or insertion template for a mounting of the implant system, in a schematic view from below, FIG. 3 the regulation system with the implant system and with the orthodontic treatment apparatus that is fastened on the implant plate device, and the drilling and/or insertion template for a mounting of the implant system, in a state when inserted in a jaw, in a schematic view, FIG. 4 the regulation system with the implant system and with the orthodontic treatment apparatus that is fastened on the implant plate device, in a state when inserted in a jaw, in a schematic view, FIG. 5 the implant system with the implant plate device and with two jawbone screws and a fastening screw, in a schematic view, FIG. 6 the jawbone screw of the implant system, in a schematic side view, FIG. 7 the jawbone screw of the implant system, in a schematic sectional view along the section line VII-VII, FIG. 8 a fastening unit of the orthodontic treatment apparatus in a schematic view, and FIG. 9 a schematic flow chart of a method for producing the drilling and/or insertion template.

DESCRIPTION OF THE EXEMPLARY EMBODIMENT

FIG. 1 shows a regulation system 42 with an implant system 24 and with an orthodontic treatment apparatus 20. The implant system 24 comprises an implant plate device 10. The implant plate device 10 is implemented by an essentially rectangular-cuboid-shaped component. The implant plate device 10 is implemented in a planar manner. However, a different shaping of the implant plate device 10, deemed expedient by someone skilled in the art, would principally also be conceivable. It would, for example, be conceivable that the implant plate device 10 is concavely curved in order to adapt to a shape of a palate. The implant plate device 10 comprises a plate base body 12. The plate base body 12 is implemented by an approximately rectangular plate, in particular a steel plate, especially preferentially a surgical steel plate. The plate base body 12 has rounded corners. A maximum extent of the plate base body 12 is maximally 20 mm, preferably maximally 17 mm and preferentially maximally 14 mm. A maximum extent of the plate base body 12 is at least approximately 12 mm. A thickness of the plate base body 12 is at least approximately 1.2 mm. A width of the plate base body 12 is at least approximately 4 mm.

The implant plate device 10 further comprises at least one fixing recess 14, 14' introduced in the plate base body 12. The implant plate device 10 comprises two fixing recesses 14, 14' introduced in the plate base body 12. The implant plate device 10 comprises a fixing recess 14 and a further fixing recess 14'. The fixing recesses 14, 14' are in each case formed by cylindrical bores extending through the plate base body 12 perpendicularly to a main extension plane of the plate base body 12. The fixing recesses 14, 14' in each case have an extension axis 56, 56' extending perpendicularly to a main extension plane of the plate base body 12. The fixing recesses 14, 14' are in each case configured to receive a jawbone screw 16, 16'. The fixing recesses 14, 14' are in each case configured to receive the jawbone screws 16, 16' of the implant system 24. The implant plate device 10 further comprises at least one inner thread adjoining at least one of the fixing recesses 14, 14'. The implant plate device 10 comprises an inner thread adjoining the fixing recess 14. Furthermore, the implant plate device 10 comprises an inner thread adjoining the further fixing recess 14'. The enveloping surfaces of the plate base body 12 which delimit the fixing recesses 14, 14' are in each case provided with an inner thread.

The implant plate device 10 further comprises a functional recess 18 that is introduced in the plate base body 12. The functional recess 18 is formed by a cylindrical bore extending through the plate base body 12 perpendicularly to a main extension plane of the plate base body 12. The functional recess 18 has an extension axis 58 extending perpendicularly to a main extension plane of the plate base body 12. The functional recess 18 is configured for a coupling with the orthodontic treatment apparatus 20 and/or with a drilling and/or insertion templet 22. The functional recess 18 can be coupled both with the orthodontic treatment apparatus 20 and with the drilling and/or insertion templet 22. The implant plate device 10 moreover comprises an inner thread which adjoins the functional recess 18 and is configured for an angle-stable coupling with the orthodontic treatment apparatus 20 and/or with the drilling and/or insertion templet 22. The enveloping surface of the plate base body 12 that delimits the functional recess 18 is provided with an inner thread (FIGS. 1, 5).

The further fixing recess 14' is arranged on a side of the functional recess 18 that is situated opposite the fixing recess 14. The fixing recess 14, the further fixing recess 14' and the functional recess 18 are arranged along the main extension direction of the plate base body 12 in a row, the functional recess 18 being arranged between the fixing recesses 14, 14'. The extension axes 56, 56', 58 of the fixing recess 14, the further fixing recess 14' and the functional recess 18 extend in each case perpendicularly to a main extension plane of the implant plate device 10. The extension axes 56, 56', 58 of the fixing recess 14, the further fixing recess 14' and the functional recess 18 are arranged in a common plane (FIG. 5).

The implant system 24 comprises the implant plate device 10 and at least one jawbone screw 16, 16'. The implant system 24 comprises two jawbone screws 16, 16'. The jawbone screws 16, 16' are configured, for a fixation of the implant plate device 10 on a jawbone, to be screwed through the fixing recesses 14, 14' into a jawbone. The jawbone 16 is configured to be screwed through the fixing recess 14. The jawbone screw 16' is configured to be screwed through the further fixing recess 14'. The jawbone screws 16, 16' are implemented identically. In the following only one jawbone screw 16 of the jawbone screws 16, 16' will be described exemplarily, wherein a description of the jawbone screw 16 is also applicable to the jawbone screw 16'.

The jawbone screw 16 comprises a screwhead 60 and a threaded shaft 62. By way of example, the screwhead 60 is implemented by a torx screwhead. The jawbone screw 16 further comprises a first thread 26 for screwing into a bone, and a second thread 28 for screwing into the inner thread of the implant plate device 10 that adjoins the fixing recess 14. The thread pitch of the first thread 26 differs from a thread pitch of the second thread 28. The jawbone screw comprises at its screwhead 60 the second thread 28, which is respectively configured to be screwed into the inner thread of the implant plate device 10 which is allocated to the fixing recess 14. The first thread 26 constitutes a main thread and is arranged on the threaded shaft 62. The first thread 26 is separated from the second thread 28 by a cylindrical section of the jawbone screw 16. Preferentially the different thread pitches result in a lifting or a pressing to the mucous membrane. The thread pitch of the second thread 28 of the jawbone screw 16 is greater than the thread pitch of the first thread 26 of the jawbone screw 16. The second thread 28 of the screwhead 60 of the jawbone screw 16 has a greater thread pitch than the first thread 26 of the threaded shaft 62 of the jawbone screw 16. As a result, by turning the second thread 28 of the jawbone screw 16 into the implant plate device 10, subsequent lifting of the implant plate device 10 and thus a lifting of the patient's mucous membrane is achievable (FIGS. 6, 7).

The regulation system 42 is configured for a regulation of tooth positions and/or jaw positions. The regulation system 42 comprises the implant system 24 and an orthodontic treatment apparatus 20, which is fastened to the implant plate device 10. The orthodontic treatment apparatus 20 may have different implementations which are deemed expedient by someone skilled in the art. It would also be conceivable that the orthodontic treatment apparatus 20 is changed and/or exchanged during a treatment. The orthodontic treatment apparatus 20 shown is therefore in particular an exemplary orthodontic treatment apparatus.

The orthodontic treatment apparatus 20 comprises an arch element 44, which is integrally connected to the plate base body 12 of the implant plate device 10. The arch element 44 is configured, in an inserted state, to extend over a large portion of a patient's dental arch along the dental arch. The arch element 44 is formed by a metal arc. It would be conceivable that the arch element 44 is implemented as a palatal arch and/or expansion arch, which may be provided on its functional ends with fastening units for a reversible fastening to teeth 36. The arch element 44 further has an at least approximately rectangular cross section in a treatment zone, i. e. in a zone extending along the dental arch. The arch element 44 has a rectangular cross section in a plane that is perpendicular to a main extension 64, which extends parallel to the dental arch. The arch element 44 has a curved main extension 64. The arch element 44 has along its main extension 64 a cross section that remains constant. The arch element 44 is implemented by a wire having a non-circular, e. g. rectangular, oval or elliptic, cross section. The arch element 44 is configured for a coupling with a fastening unit 46, 46', which is rotationally fix and torque-proof or has a defined tolerance. The arch element 44 is welded to the plate base body 12 of the implant plate device 10. A one-piece implementation is also possible. The orthodontic treatment apparatus 20 comprises a connecting web 66, via which the arch element 44 is connected to the plate base body 12. The connecting web 66 is implemented in a T-shape. The connecting web 66 is welded to the plate base body 12 and to the arch element 44. It would principally also be conceivable that the arch element 44 is connected releasably with the implant plate device 10 via the functional recess 18 (FIG. 3).

The orthodontic treatment apparatus 20 further comprises at least one fastening unit 46, 46' for a fastening to a tooth 36. The orthodontic treatment apparatus 20 comprises two fastening units 46, 46' for a fastening to respectively one tooth 36. The fastening units 46, 46' in each case have a first fastening element 48, 48' for a direct fixation to a tooth 36. The first fastening elements 48, 48' are respectively implemented by an orthodontic band. The fastening units 46, 46' further comprise respectively a pin 68, 68'. The pins 68, 68' are in each case configured to be fastened to the respective tooth 36 via the first fastening element 48, 48'. The pins 68, 68' in each case have an I-shape, an L-shape or a T-shape. The pins 68, 68' are in each case welded to one of the first fastening elements 48, 48'. Alternatively, the pins 68, 68' could also be fastened directly to the tooth 36 adhesively by means of a glue basis. A one-piece production in the form of a cast or an additively manufactured band is also conceivable. The pins 68, 68' are respectively located on the oral or buccal side of the tooth 36, serving at the same time as a receptacle for a matching second fastening element 50, 50' which the arch element 44 can be fastened to.

The fastening units 46, 46' in each case comprise a second fastening element 50, 50', connected to the first fastening element 48, 48', for a rotationally fix connection to the arch element 44. The second fastening elements 50, 50' are connected to the first fastening elements 48, 48' of the respective fastening unit 46, 46' in each case via the pins 68, 68' of the respective fastening unit 46, 46'. The second fastening elements 50, 50' in each case have at least one fixing sleeve 52, 52', 70. The second fastening elements 50, 50' in each case have a fixing sleeve 70 with an inner cross section matching the pin 68, 68'. For a temporary fastening to the pin 68, 68' of the respective fastening unit 46, 46', the second fastening elements 50, 50' further comprise respectively one grub screw. The second fastening elements 50, 50' in each case further comprise two further fixing sleeves 52, 52'. The fixing sleeves 52, 52' of the second fastening elements 50, 50' are in each case configured to engage around the arch element 44. The fixing sleeves 52, 52' of the second fastening elements 50, 50' in each case comprise an at least approximately rectangular receiving region 54 for the arch element 44. The fixing sleeves 52, 52' of the second fastening elements 50, 50' have an inner cross section that matches the arch element 44. The second fastening elements 50, 50' are in each case embodied as a triple tube. For a temporary fastening to the arch element 44, the second fastening elements 50, 50' further comprise respectively one grub screw (FIG. 8).

FIG. 1 further shows a drilling and/or insertion templet 22 for a mounting of the implant system 24 on a jaw 32. The drilling and/or insertion templet 22 comprises at least one alignment element 34, 34', 34'', 34'''. The drilling and/or insertion templet 22 comprises four alignment elements 34, 34', 34'', 34''', wherein respectively two alignment elements 34, 34', 34'', 34''' are arranged directly next to each other. The alignment elements 34, 34', 34'', 34''' are in each case configured for a support on respectively one tooth 36 of the jaw 32. Two of the alignment elements 34, 34', 34'', 34''' are configured to support themselves on lefthand molars, whereas two of the alignment elements 34, 34', 34'', 34''' are configured to support themselves on righthand molars. The alignment elements 34, 34', 34'', 34''' are in each case implemented at least cylindrically, a base side having an individual shape that is adapted to a tooth surface. The drilling and/or insertion templet 22 furthermore comprises a connection element 74. The connection element 74 is configured to connect the alignment elements 34, 34', 34'', 34'''. The connection element 74 extends from a lefthand row of teeth to a righthand row of teeth. The connection element 74 has a round cross section. The connection element 74 furthermore has a curved contour that is adapted to a shape of a palate. Beyond this, the drilling and/or insertion templet 22 comprises a fixing element 38, which is firmly connected to the alignment elements 34, 34', 34'', 34''' and which is configured to be connected to the implant plate device 10 via the functional recess 18. The fixing element 38 is arranged on the connection element 74. The fixing element 38 is arranged on the connection element 74 between the lefthand alignment elements 34, 34' and the righthand alignment elements 34'' and 34'''. The fixing element 38 is embodied in a plate shape and has a central bore. The fixing element 38 is configured for an establishment of a releasable connection to the implant plate device 10. The fixing element 38 is configured to be connected to the implant plate device 10 via a screw 76. For a connection, the screw 76 is screwed through the bore in the fixing element 38 into the functional recess 18 of the implant plate device 10.

Furthermore, the drilling and/or insertion templet 22 comprises a guiding cylinder 40, 40', which is firmly connected to the fixing element 38. The drilling and/or insertion templet 22 comprises two guiding cylinders 40, 40', which are firmly connected to the fixing element 38. The guiding cylinders 40, 40' are configured for guiding a pre-drill and/or an insertion instrument for the jawbone screw 16, 16'. The guiding cylinders 40, 40' are in each case implemented by a hollow cylinder. The guiding cylinders 40, 40' are in each case implemented by a guiding sleeve for an angle-preserving guidance of a pre-drill and/or of an insertion instrument for the jawbone screw 16, 16'. The guiding cylinders 40, 40' are arranged on opposite-situated sides of the fixing element 38. A medium distance of the guiding cylinders 40, 40' in particular corresponds to a medium distance of the fixing recesses 14, 14'.

The alignment elements 34, 34', 34", 34'" are integrally connected to the fixing element 38. The alignment elements 34, 34', 34", 34'" are integrally connected to the fixing element 38 via the connection element 74. The drilling and/or insertion templet 22 is implemented in one piece. The drilling and/or insertion templet 22 is produced in a 3D-printing procedure.

FIG. 9 shows a schematic flow chart of a method for producing the drilling and/or insertion templet 22. In the method, in a first method step 78 a digital imprint of a patient's jaw 32, in particular of a patient's dentition, is made via a scan process. Furthermore, in the method the drilling and/or insertion templet 22 is adapted individually to a jaw shape and/or tooth shape, in particular on the basis of the scan data, in an additive production method, in particular in a 3D-printing procedure. In a second method step 80, a virtual 3D model of the drilling and/or insertion templet 22 is constructively created on the basis of the scan data of the jaw 32. After this, the drilling and/or insertion templet 22 is produced in a 3D-printing procedure in a third method step 82. The individually produced drilling and/or insertion templet 22 can then be utilized for a screwing of the implant system 24 into the jaw 32.

REFERENCE NUMERALS

- 10 implant plate device
- 12 plate base body
- 14 fixing recess
- 14' fixing recess
- 16 jawbone screw
- 16' jawbone screw
- 18 functional recess
- 20 treatment apparatus
- 22 drilling and/or insertion templet
- 24 implant system
- 26 thread
- 28 thread
- 32 jaw
- 34 alignment element
- 34' alignment element
- 34" alignment element
- 34'" alignment element
- 36 tooth
- 38 fixing element
- 40 guiding cylinder
- 40' guiding cylinder
- 42 regulation system
- 44 arch element
- 46 fastening unit
- 46' fasting unit
- 48 fastening element
- 48' fastening element
- 50 fastening element
- 50' fastening element
- 52 fixing sleeve
- 52' fixing sleeve
- 54 receiving region
- 56 extension axis
- 56' extension axis
- 58 extension axis
- 60 screwhead
- 62 threaded shaft
- 64 main extension
- 66 connecting web
- 68 pin
- 68' pin
- 70 fixing sleeve
- 74 connection element
- 76 screw
- 78 method step
- 80 method step
- 82 method step

The invention claimed is:

1. A regulation system for a regulation of tooth and/or jaw positions, with at least one implant system with an implant plate device, with at least one fixing recess, which is introduced in the plate base body and is configured for receiving a jawbone screw that is configured, for a fixation of the plate base body, to be screwed through the fixing recess into a bone, and with at least one inner thread adjoining the fixing recess, comprising at least one functional recess, introduced in the plate base body, for a coupling with an orthodontic treatment apparatus and/or with a drilling and/or insertion templet, and with at least one jawbone screw which is configured, for a fixation of the implant plate device on a bone, to be screwed through the fixing recess into a bone, and with at least one orthodontic treatment apparatus that is fastened to the implant plate device, wherein the orthodontic treatment apparatus comprises at least one arch element, which is integrally connected to the plate base body of the implant plate device, and wherein the orthodontic treatment apparatus comprises at least one fastening unit for a fastening to a tooth, with at least one first fastening element for a direct fixation to a tooth, and with at least one second fastening element, which is connected to the first fastening element, for a connection to the arch element that is rotationally fix, and wherein the second fastening element comprises at least one fixing sleeve, which is configured to engage around the arch element and which has an approximately rectangular receiving region for the arch element.

2. A regulation system according to claim 1,
comprising
at least one inner thread which adjoins the functional recess and is configured for an angle-stable coupling with an orthodontic treatment apparatus and/or with a drilling and/or insertion templet.

3. A regulation system according to claim 1,
comprising
a further fixing recess, which is introduced in the plate base body, which is arranged on a side of the functional recess that is situated opposite the at least one fixing recess and which is configured for receiving a jawbone screw that is configured, for a fixation of the plate base body, to be screwed through the further fixing recess into a bone, and by at least one inner thread adjoining the further fixing recess.

4. A regulation system according to claim 1,
wherein a maximum extension of the plate base body is maximally 20 mm.

5. A regulation system according to claim 1, wherein
the at least one jawbone screw comprises at least one first thread for screwing into a bone, and at least one second thread for screwing into the inner thread of the implant plate device that adjoins the fixing recess, wherein a thread pitch of the first thread differs from a thread pitch of the second thread.

6. A regulation system according to claim 1, wherein the thread pitch of the second thread of the jawbone screw is greater than the thread pitch of the first thread of the jawbone screw.

7. The regulation system according to claim 1, wherein
the orthodontic treatment apparatus comprises at least one arch element, which is integrally connected to the plate base body of the implant plate device, and wherein the at least one arch element is welded or integrally connected to the plate base body of the implant plate device.

8. The regulation system according to claim 1, wherein
the orthodontic treatment apparatus comprises at least one arch element, which is integrally connected to the plate base body of the implant plate device, and wherein the orthodontic treatment apparatus comprises at least one arch element, which has in at least one treatment zone a at least approximately rectangular cross section.

9. A regulation system for a regulation of tooth and/or jaw positions, with at least one implant system with an implant plate device, with at least one fixing recess, which is introduced in the plate base body and is configured for receiving a jawbone screw that is configured, for a fixation of the plate base body, to be screwed through the fixing recess into a bone, and with at least one inner thread adjoining the fixing recess, comprising at least one functional recess, introduced in the plate base body, for a coupling with an orthodontic treatment apparatus and/or with a drilling and/or insertion templet, and with at least one jawbone screw which is configured, for a fixation of the implant plate device on a bone, to be screwed through the fixing recess into a bone, and with at least one orthodontic treatment apparatus that is fastened to the implant plate device,
wherein the orthodontic treatment apparatus comprises at least one arch element, which is integrally connected to the plate base body of the implant plate device, and wherein the orthodontic treatment apparatus comprises at least one fastening unit for a fastening to a tooth, with at least one first fastening element for a direct fixation to a tooth, and with at least one second fastening element, which is connected to the first fastening element, for a connection to the arch element that has a defined clearance, and wherein the second fastening element comprises at least one fixing sleeve, which is configured to engage around the arch element and which has an approximately rectangular receiving region for the arch element.

* * * * *